(12) United States Patent
Chang et al.

(10) Patent No.: US 7,227,725 B1
(45) Date of Patent: Jun. 5, 2007

(54) HEAD STACK ASSEMBLY WITH LOCKING PINS FOR RETAINING FLEX CABLE

(75) Inventors: Ken L. Chang, Saratoga, CA (US); Chunjer C. Cheng, Saratoga, CA (US)

(73) Assignee: Western Digital Technologies Inc., Lake Forest, CA (US)

( * ) Notice: Subject to any disclaimer, the term of this patent is extended or adjusted under 35 U.S.C. 154(b) by 531 days.

(21) Appl. No.: 10/837,470

(22) Filed: Apr. 30, 2004

(51) Int. Cl.
*G11B 21/02* (2006.01)
*G11B 21/21* (2006.01)

(52) U.S. Cl. .............................. 360/264.2; 360/245.9

(58) Field of Classification Search ............ 360/265.7, 360/264.2, 266.3
See application file for complete search history.

(56) References Cited

U.S. PATENT DOCUMENTS

| | | | | |
|---|---|---|---|---|
| 5,095,396 A | * | 3/1992 | Putnam et al. | 360/264.2 |
| 5,161,074 A | * | 11/1992 | Forbord et al. | 360/264.2 |
| 5,650,896 A | * | 7/1997 | Viskochil | 360/265.7 |
| 5,781,380 A | * | 7/1998 | Berding et al. | 360/264.2 |
| 6,166,888 A | * | 12/2000 | Tsuda et al. | 360/264.2 |
| 6,236,531 B1 | * | 5/2001 | Allsup et al. | 360/97.01 |
| 6,600,633 B2 | * | 7/2003 | Macpherson et al. | 360/265.8 |
| 6,992,864 B2 | * | 1/2006 | Kaneko et al. | 360/264.2 |
| 2003/0043508 A1 | * | 3/2003 | Schulz et al. | 360/245.9 |

FOREIGN PATENT DOCUMENTS

| | | | | |
|---|---|---|---|---|
| JP | 63302413 A | * | 12/1988 | |
| JP | 63302414 A | * | 12/1988 | |
| JP | 02166678 A | * | 6/1990 | |
| JP | 09128911 A | * | 5/1997 | |
| JP | 10092125 A | * | 4/1998 | |
| JP | 10092126 A | * | 4/1998 | |
| KR | 2001084543 A | * | 9/2001 | |

* cited by examiner

*Primary Examiner*—William J Klimowicz
(74) *Attorney, Agent, or Firm*—Stetina, Brunda, Garred & Brucker

(57) ABSTRACT

A head stack assembly for a disk drive. The head stack assembly includes an actuator defining an axis of rotation. The actuator includes an actuator arm defining a longitudinal axis orthogonal to the axis of rotation. The actuator includes an actuator body formed of overmolded plastic. The actuator includes first and second locking pins extending from the actuator body orthogonal to the axis of rotation. The flex cable includes a first opening engaged with the first locking pin in a direction generally parallel to the longitudinal axis for retaining the flex cable. The flex cable includes a second opening engaged with the second locking pin in a direction generally parallel to the axis of rotation for retaining the flex cable.

22 Claims, 4 Drawing Sheets

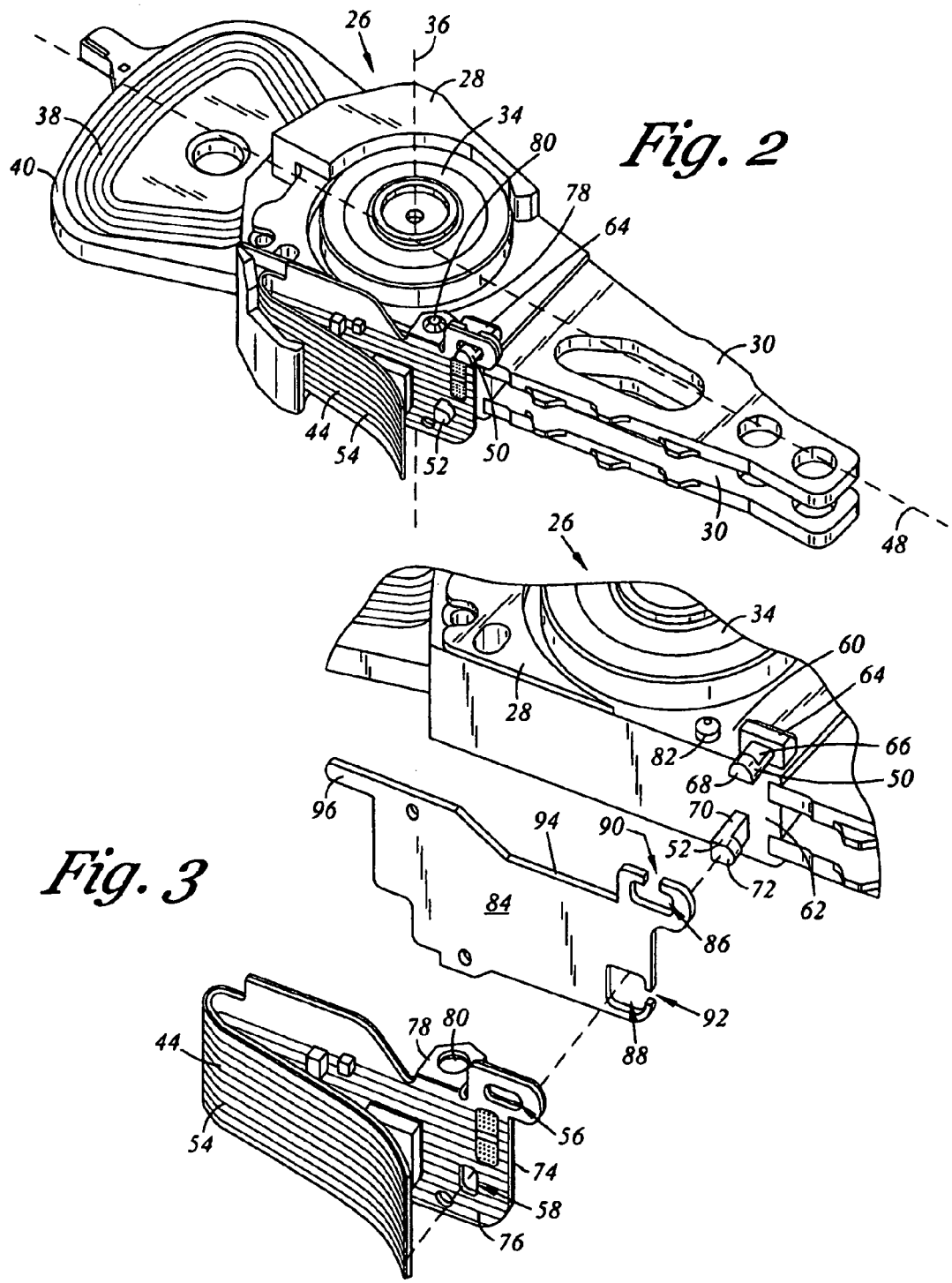

HEAD STACK ASSEMBLY WITH LOCKING PINS FOR RETAINING FLEX CABLE

BACKGROUND OF THE INVENTION

1. Field of the Invention

The present invention relates generally to disk drives, and in particular to a disk drive including a head stack assembly with locking pins for retaining a flex cable.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base and supports a lowermost one of the disks. The head stack assembly has an actuator assembly having at least one air bearing slider, typically several, for reading and writing data from and to the disk. Each slider includes a transducer head for reading and writing data. The printed circuit board assembly includes a servo control system in the form of a disk controller for generating servo control signals. The head stack assembly is controllably positioned in response to generated servo control signals from the disk controller. In so doing, the attached sliders are controllably moved relative to tracks disposed upon the disk for reading and writing operations.

The head stack assembly includes an actuator assembly, at least one head gimbal assembly, and a flex circuit assembly. A conventional "rotary" or "swing-type" actuator assembly typically includes an actuator having an actuator body. The actuator body is configured to rotate on a pivot assembly between limited positions about an axis of rotation. One or more actuator arms extend from an opposite side of the actuator body. A head gimbal assembly is distally attached to each of the actuator arms. A head gimbal assembly includes an air bearing slider that is attached to a suspension with a gimbal. The suspension resiliently supports the air bearing slider above the tracks of the disk during operation of the disk drive facilitating the slider to "fly" above the disk.

A coil is supported by a coil support that extends from an opposite side of the actuator body. The coil is configured to interact with one or more permanent magnets to form a voice coil motor. The coil is disposed in electrical communication with the disk controller through a flex circuit assembly. Controlled movement of the head stack assembly is achieved by selectively energizing the coil with the generated servo control signals.

The flex circuit assembly is configured (1) to supply current to the actuator coil and (2) to carry signals between the transducer heads and the printed circuit board assembly. The flex circuit assembly includes a flex cable (also referred to as a flex circuit cable or flex circuit), an integrated circuit device, and a cable connector.

At one end of the flex cable there is provided a mounting portion that is attached to the actuator body. Adjacent to the mounting portion, the flex cable contains a terminal pad portion for connecting a plurality of electrically conductive traces embedded within the flex cable to electrical connectors, such as insulated wires. The wires extend along each actuator arm to each transducer head for transmitting data signals to and from the transducer heads. At an opposing end of the flex cable, there is provided a cable connector that is attached to the disk drive base and electrically connected to the printed circuit board assembly.

The flex cable typically includes a base film, a plurality of electrically conductive traces and a cover film. The base film is commonly formed of a polyimide material. The electrically conductive traces are formed upon the base film. The cover film is then selectively disposed over the metal traces and the base film for electrically insulating the traces. Adjacent to the mounting portion of the flex cable, the integrated circuit device is supported by the base film and is electrically connected to the traces. The integrated circuit device includes a preamplifier for enhancing signals passed from the transducer heads.

The flex cable includes a dynamic loop portion that is supported by a cable guide. The cable guide conventionally takes the form of a plastic clip attached to the actuator body. The cable guide maintains the dynamic loop portion in an upright position in planes parallel to the axis of rotation. This configuration permits relatively free rotation of the overall head stack assembly.

As can be appreciated, a reduction in the complexity of manufacturability and assembly with respect to head stack assembly would represent an improved head stack assembly configuration in comparison to the prior art.

SUMMARY OF THE INVENTION

According to an aspect of the present invention, there is provided a head stack assembly for a disk drive. The head stack assembly includes an actuator defining an axis of rotation. The actuator includes an actuator arm defining a longitudinal axis orthogonal to the axis of rotation. The actuator further includes an actuator body formed of overmolded plastic disposed about the actuator arm. The actuator further includes first and second locking pins extending from the actuator body orthogonal to the axis of rotation. The head stack assembly further includes a flex cable. The flex cable includes a cable body. The flex cable further includes a first opening formed through the cable body. The first opening is engaged with the first locking pin in a direction generally parallel to the longitudinal axis for retaining the flex cable. The flex cable further includes a second opening formed through the cable body. The second opening is engaged with the second locking pin in a direction generally parallel to the axis of rotation for retaining the flex cable.

According to various embodiments, the first and second locking pins may be integrally formed with the actuator body. The first and second locking pins may be formed of overmolded plastic. The actuator body may include a lateral surface disposed parallel to the axis of rotation and a horizontal surface disposed orthogonal to the axis of rotation. A given one of first and second locking pins may be attached to the horizontal surface. The given one of the first and second locking pins may include a pin base and a pin shaft. The pin base is attached to the horizontal surface. The pin shaft may extend from the pin base disposed orthogonal to the axis of rotation. The pin base may be off-set from the lateral surface. The first locking pin may include a first pin shaft and a first pin retaining cap distally disposed from the first pin shaft. The flex cable may be disposed between the first pin retaining cap and the actuator body. The second locking pin may include a second pin shaft and a second pin retaining cap distally disposed from the second pin shaft. The flex cable may be disposed between the second pin retaining cap and the actuator body. The cable body may include a base film, and the first and second openings may be formed through the base film. The base film may be formed of a polyimide material. The flex cable may further include a stiffener, and the stiffener may be formed of a material stiffer than a material of the base film. The stiffener may include a first stiffener opening with the first locking pin disposed through the first stiffener opening, and the stiffener may further include a second stiffener opening with the second locking pin disposed through the second stiffener opening. The first stiffener opening may include an open end disposed at a periphery of the stiffener. The second stiffener opening may include an open end disposed at the periphery of the stiffener. The stiffener may be formed of a metal material. The stiffener may be disposed between the base film and the actuator body. The stiffener may include an extension portion engaged with the actuator body in a direction parallel to the axis of rotation.

According to another aspect of the present invention, there is provided a disk drive. The disk drive includes a disk drive base and the head stack assembly rotatably coupled to the disk drive base. The head stack assembly body is as described above.

BRIEF DESCRIPTION OF THE DRAWINGS

FIG. 2 is an enlarged perspective view of a portion of a head stack assembly including an actuator and a portion of a flex cable of FIG. 1;

FIG. 3 is an enlarged exploded perspective view of the portion of the actuator and the flex cable with a cable body and a stiffener of FIG. 2;

DESCRIPTION OF THE PREFERRED EMBODIMENTS

Figure 1:
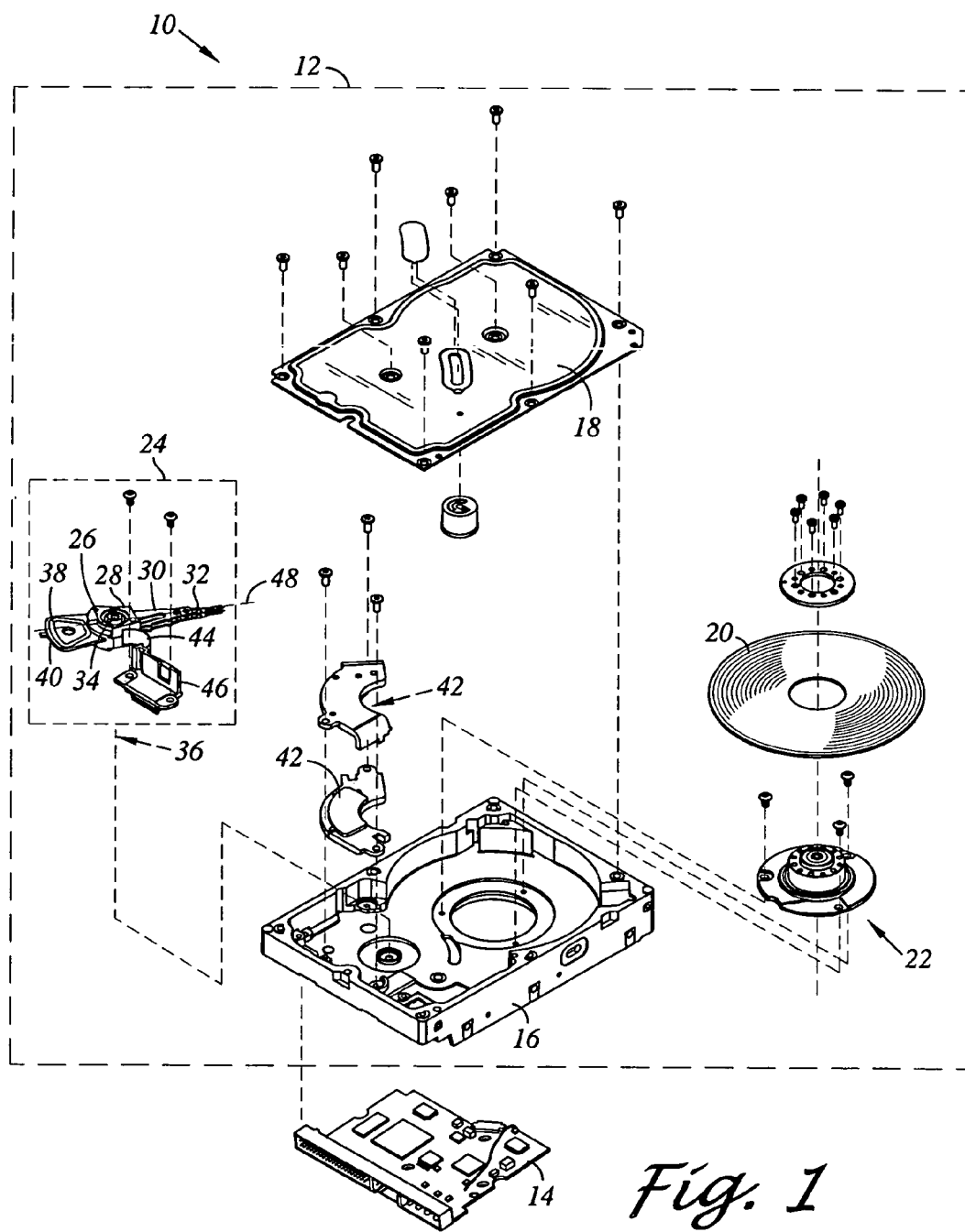
FIG. 1 is an exploded perspective view of a disk drive in accordance with an aspect of the present invention.
Figure 4:
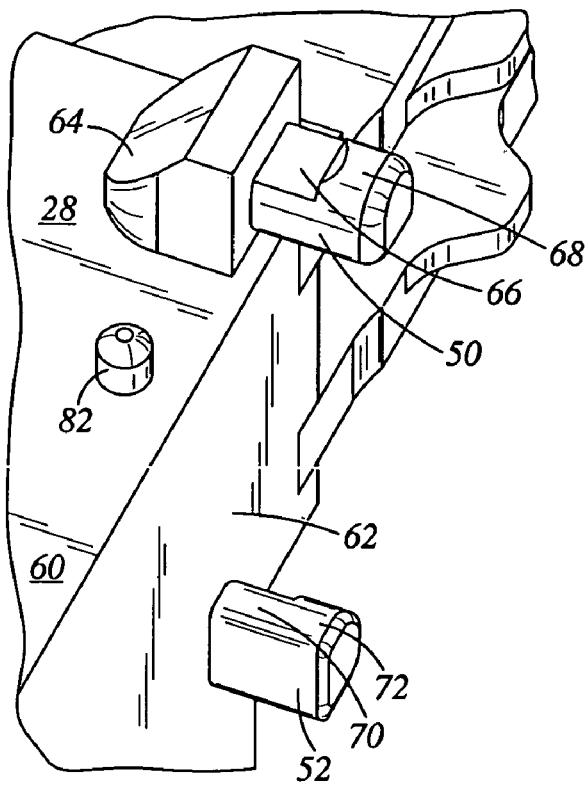
FIG. 4 is an enlarged perspective view from another angle of a portion of the actuator of FIG. 3.
Figure 5:
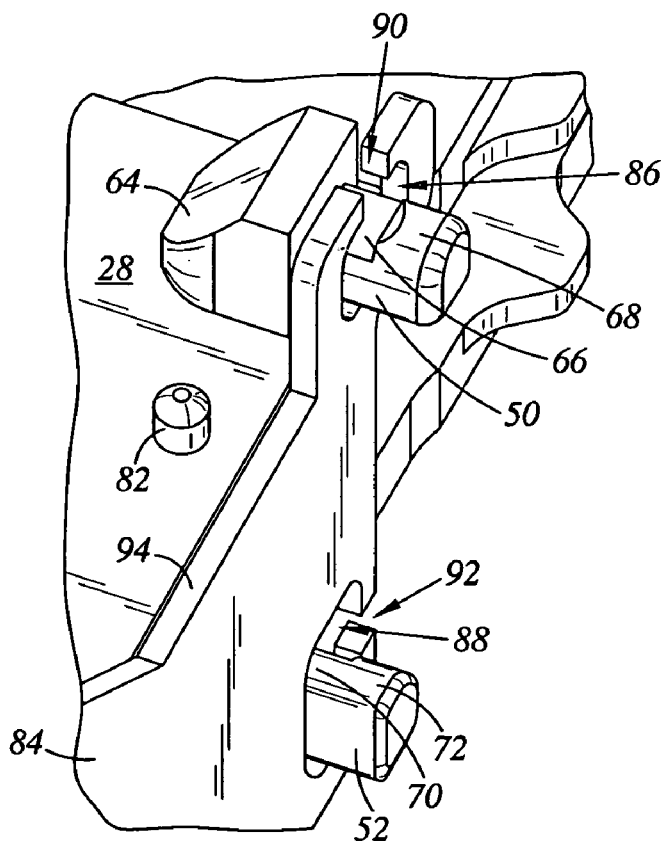
FIG. 5 is the enlarged perspective view of the actuator of FIG. 4 as shown with a portion of the stiffener attached.
Figure 6:
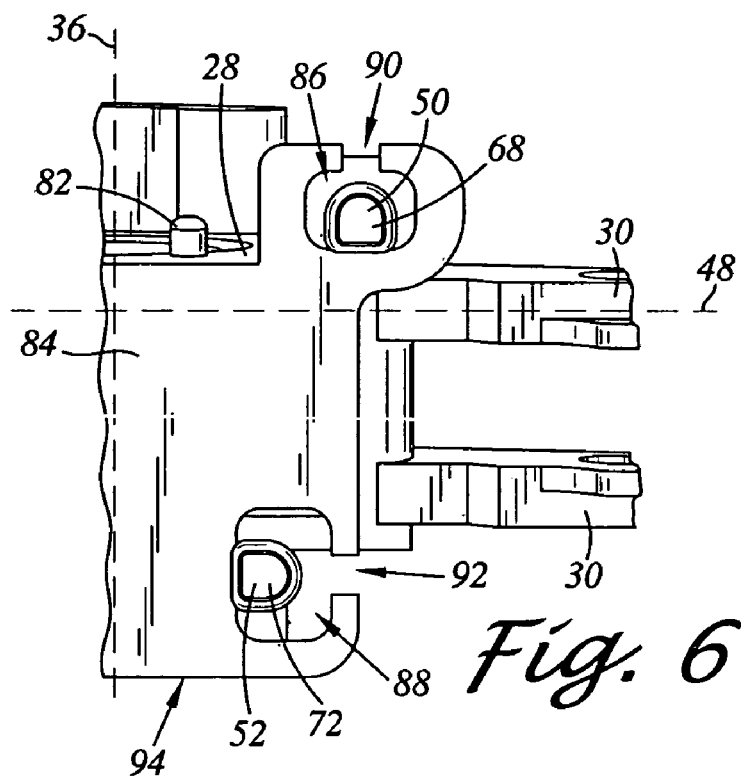
FIG. 6 is the enlarged side view of the actuator and stiffener of FIG. 5.

Referring now to the drawings wherein the showings are for purposes of illustrating preferred embodiments of the present invention only, and not for purposes of limiting the same, FIGS. 1-7 illustrate a head stack assembly and a disk drive in accordance with aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a magnetic disk 20. The disk 20 contains a plurality of tracks for storing data. The head disk assembly 12 further includes a spindle motor 22 for rotating the disk 20. The head disk assembly 12 further includes a head stack assembly 24 rotatably attached to the disk drive base 16 in operable communication with the disk 20. The head stack assembly 24 includes a rotary actuator 26.

The actuator 26 includes an actuator body 28 and actuator arms (the uppermost one denoted 30) that extends from the actuator body 28. Distally attached to each actuator arm 30 is a head gimbal assembly 32. The head gimbal assembly 32 includes a slider. The slider includes a transducer head. The actuator body 28 includes a bore, and the actuator 26 further includes a pivot bearing cartridge 34 engaged within the bore for facilitating the actuator body 28 to rotate between limited positions about an axis of rotation 36. A coil 38 is supported by a coil support 40 that extends from an opposite side of the actuator body 28. The coil 38 is configured to interact with a pair of permanent magnets 42 to form a voice coil motor. A flex cable 44 is attached to the actuator body 28. The flex cable 44 includes a cable connector 46 that electrically connects the actuator 26 to the printed circuit board assembly 14.

According to an aspect of the present invention, there is provided the head stack assembly 24 for a disk drive 10. The head stack assembly 24 includes the actuator 26 defining the axis of rotation 36. Shown in FIG. 2 is an enlarged perspective view of a portion of a head stack assembly 24 including a portion of the actuator 26 and a portion of a flex cable 44 of FIG. 1. FIG. 3 is an enlarged exploded perspective view of the portion of the head stack assembly 24 including a portion of the actuator 26 and a portion of a flex cable 44 of FIG. 2.

Figure 7:
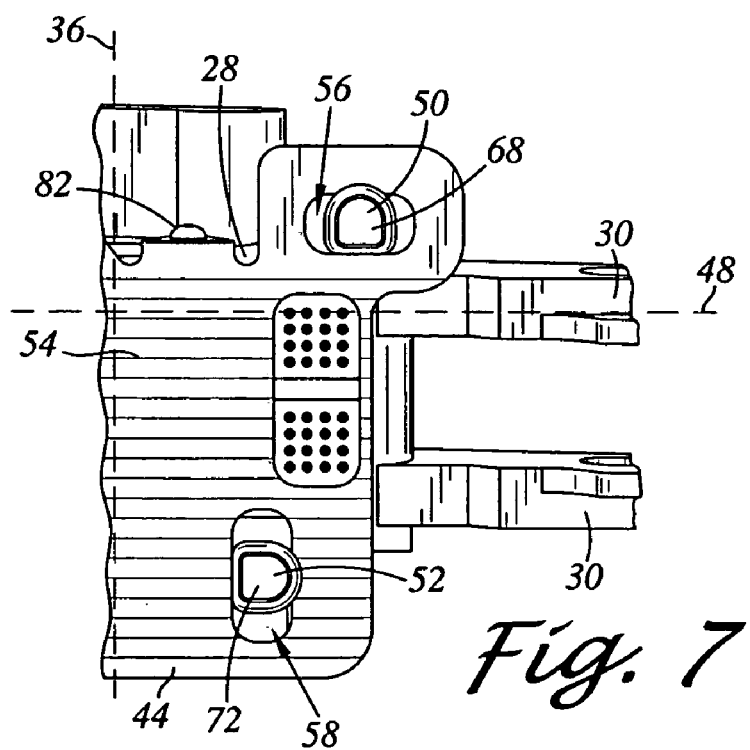
FIG. 7 is the enlarged side view of the actuator and stiffener of FIG. 6 as shown with a portion of the cable body attached.

The actuator 26 includes the actuator arm 30 that defines a longitudinal axis 48 orthogonal to the axis of rotation 36. The actuator 26 further includes the actuator body 28 formed of overmolded plastic disposed about the actuator arm 30. The actuator 26 further includes first and second locking pins 50, 52 extending from the actuator body 28 orthogonal to the axis of rotation 36. The head stack assembly 24 further includes the flex cable 44. The flex cable 44 includes a cable body 54. The flex cable 44 further includes a first opening 56 formed through the cable body 54. Referring additionally to FIG. 7, there is depicted an enlarged side view of a portion of the actuator 26 as shown with a portion of the cable body 54 attached. The first opening 56 is engaged with the first locking pin 50 in a direction generally parallel to the longitudinal axis 48 for retaining the flex cable 44. The flex cable 44 further includes a second opening 58 formed through the cable body 54. The second opening 58 is engaged with the second locking pin 52 in a direction generally parallel to the axis of rotation 36 for retaining the flex cable 44.

Advantageously, because the flex cable 44 may be securely retained adjacent the actuator 26 with the engagement of the first and second locking pins 50, 52 to the counterpart mating first and second openings 56, 58, use of additional parts such as a cable retaining clip is avoided, as well as, those cost and assembly burdens associated with the same.

As mentioned above, the first opening 56 is engaged with the first locking pin 50 in a direction generally parallel to the longitudinal axis 48 for retaining the flex cable 44. In this regard, as shown in the embodiment depicted in FIG. 7, such engagement is configured to restrain vertical movement of the flex cable 44. As further mentioned above, the second opening 58 is engaged with the second locking pin 52 in a direction generally parallel to the axis of rotation 36 for retaining the flex cable 44. In this regard, as shown in the embodiment depicted in FIG. 7, such engagement is configured to restrain horizontal movement of the flex cable 44. As the flex cable 44 is disposed against and therefore supported by the actuator body 28, the flex cable 44 is contemplated to be securely restrained in all translational directions of movement. Further, as seen in the view of FIG. 7, the first and second lock pins 50, 52 are contemplated to cooperatively restrain in-page rotational movement as well (i.e., clockwise and counter-clockwise rotation).

As mentioned above, the actuator body 28 is formed of overmolded plastic disposed about the actuator arm 30. Multiple actuator arms 30 may be provided as shown. The actuator arms 30 may be formed of a stamped material, such as aluminum or stainless steel. As used herein, the actuator body 28 refers to that portion of the actuator 26 that is disposed adjacent the pivot bearing cartridge 34 between the coil support 40 and the actuator arm 30. The actuator body 28 may include a base portion of the actuator arm 30. In this regard, it is contemplated that at least some portion of the actuator body 28 is formed of overmolded plastic, and thus the actuator body 28 is not required to be completely formed of overmolded plastic.

According to various embodiments, the first and second locking pins 50, 52 may be integrally formed with the actuator body 28. In this regard, the first and second locking pins 50, 52 may be formed of overmolded plastic. While the first locking pin 50 is shown as integrally formed with the actuator body 28, the first locking pin 50 may be separately formed and attached to the actuator arm 30. Such attachment may be through the use of an adhesive or by way of press-fit with the actuator arm 30. As best seen in the enlarged perspective views of FIGS. 3 and 4, the actuator body 28 may include a horizontal surface 60 disposed orthogonal to the axis of rotation 36, and a lateral surface 62 disposed parallel to the axis of rotation 36. In the embodiment shown, the first locking pin 50 is attached to the horizontal surface 60 and the second locking pin 52 is attached to the lateral surface 62.

The first locking pin 50 includes a pin base 64 and a first pin shaft 66. The pin base 64 is attached to the horizontal surface 60. The first pin shaft 66 extends from the pin base 64 disposed orthogonal to the axis of rotation 36. The pin base 64 is off-set from the lateral surface 62. Such off-set is contemplated to facilitate ease of installation of the flex cable 44 as such off-set provides a degree of deflection in the lateral direction orthogonal to the axis of rotation 36. The first locking pin 50 further includes a first pin retaining cap 68 distally disposed from the first pin shaft 66. The first pin retaining cap 68 is sized larger than a diameter of the first pin shaft 66 in a direction parallel to the axis of rotation 36. Further, the first pin retaining cap 68 is sized larger than the first opening 56 in a direction parallel to the axis of rotation 36. The flex cable 44 is disposed between the first pin retaining cap 68 and the actuator body 28, and in particular the lateral surface 62. The second locking pin 52 includes a second pin shaft 70 and a second pin retaining cap 72 distally disposed from the second pin shaft 70. The second pin retaining cap 72 is sized larger than a diameter of the second pin shaft 70 in a direction parallel to the longitudinal axis 48. Further, the second pin retaining cap 72 is sized larger than the second opening 58 in a direction parallel to the longitudinal axis 48. The flex cable 44 is disposed between the second pin retaining cap 72 and the actuator body 28, and in particular the lateral surface 62.

The cable body 54 may include a base film 74 and a cover film 76. The base film 74 is disposed towards the lateral surface 62. The first and second openings 56, 58 may be formed through the base and cover films 74, 76. The base and cover films 74, 76 may be formed of a polyimide material. Though not shown in detail, it is contemplated that electrical traces are disposed between the base and cover films 74, 76. The flex cable 44 may further include a tab 78 with an opening 80. An electrical grounding pin 82 may extend from the actuator body 28. It is contemplated that the electrical grounding pin 82 may be internally connected to electrical ground within the actuator 26. The electrical traces may be connected to the electrical grounding pin 82.

The flex cable 44 may further include a stiffener 84. The stiffener 84 may be disposed between the base film 74 and the lateral surface 62 of the actuator body 28. The stiffener 84 may be formed of a material stiffer than a material of the base film 74. In this regard, the stiffener 84 may be formed of a metal material, such as aluminum or stainless steel.

The stiffener 84 may include a first stiffener opening 86 with the first locking pin 50 disposed through the first stiffener opening 86. The stiffener 84 may further include a second stiffener opening 88 with the second locking pin 52 disposed through the second stiffener opening 88. The first stiffener opening 86 may include an open end 90 disposed at a periphery 94 of the stiffener 84. The second stiffener opening 88 may include an open end 92 disposed at the periphery 94 of the stiffener 84. Such open ends 90, 92 are contemplated to facilitate local deflection of the stiffener 84 for ease of installation.

The stiffener 84 may include an extension portion 96 engaged with the actuator body 28 in a direction parallel to the axis of rotation 36. In this regard, the extension portion 96 may facilitate to additionally retain the flex cable 44 in the vertical direction. Further, the extension portion 96 is contemplated to help facilitate the installation of the flex cable 44 by providing a sturdy section of the flex cable 44 that it may be pivoted about when attempting to align the first and second locking pins 50, 52 with the first and second openings 56, 58 for engagement.

According to an aspect of the present invention, there is provided the disk drive 10. The disk drive 10 includes the disk drive base 16 and the head stack assembly 24. The head stack assembly is as described above. The actuator 26 is rotatably coupled to the disk drive base 16.

We claim:

1. A head stack assembly for a disk drive, the head stack assembly comprising:
   an actuator defining an axis of rotation, the actuator including:
      an actuator arm defining a longitudinal axis orthogonal to the axis of rotation;
      an actuator body formed of overmolded plastic disposed about the actuator arm; and
      first and second locking pins extending from the actuator body orthogonal to the axis of rotation; and
   a flex cable including:
      a cable body;
      a first opening formed through the cable body, the first opening engaged with the first locking pin in a direction generally parallel to the longitudinal axis for retaining the flex cable; and
      a second opening formed through the cable body, the second opening engaged with the second locking pin in a direction generally parallel to the axis of rotation for retaining the flex cable; and
      a stiffener including a first stiffener opening with the first locking pin disposed through the first stiffener opening and a second stiffener opening with the second locking pin disposed through the second stiffener opening, the first stiffener opening including a first open end disposed at a periphery of the stiffener, and open in a direction generally parallel to the axis of rotation, the second stiffener opening including a second open end disposed at the periphery of the stiffener, and open in a direction generally parallel to the longitudinal axis.

2. The head stack assembly of claim 1 wherein the first and second locking pins are integrally formed with the actuator body.

3. The head stack assembly of claim 1 wherein the first and second locking pins are formed of overmolded plastic.

4. The head stack assembly of claim 1 wherein the actuator body includes a lateral surface disposed parallel to the axis of rotation and a horizontal surface disposed orthogonal to the axis of rotation.

5. The head stack assembly of claim 4 wherein a given one of first and second locking pins is attached to the horizontal surface.

6. The head stack assembly of claim 5 wherein the given one of the first and second locking pins includes a pin base, the pin base is attached to the horizontal surface, the given one of the first and second locking pins further includes a pin shaft extending from the pin base disposed orthogonal to the axis of rotation.

7. The head stack assembly of claim 6 wherein the pin base is off-set from the lateral surface.

8. The head stack assembly of claim 1 wherein the first locking pin includes a first pin shaft and a first pin retaining cap distally disposed from the first pin shaft, the flex cable is disposed between the first pin retaining cap and the actuator body, the second locking pin includes a second pin shaft and a second pin retaining cap distally disposed from the second pin shaft, the flex cable is disposed between the second pin retaining cap and the actuator body.

9. The head stack assembly of claim 1 wherein the cable body includes a base film, the first and second openings are formed through the base film.

10. The head stack assembly of claim 9 wherein the base film is formed of a polyimide material.

11. The head stack assembly of claim 1 wherein the cable body includes a base film, the stiffener is formed of a material stiffer than a material of the base film.

12. The head stack assembly of claim 11 wherein the stiffener is formed of a metal material.

13. The head stack assembly of claim 11 wherein the stiffener is disposed between the base film and the actuator body.

14. The head stack assembly of claim 11 wherein the stiffener includes an extension portion, the extension portion is engaged with the actuator body in a direction parallel to the axis of rotation.

15. A disk drive comprising:
a disk drive base; and
a head stack assembly rotatably coupled to the disk drive base, the head stack assembly including:
an actuator defining an axis of rotation, the actuator including:
an actuator arm defining a longitudinal axis orthogonal to the axis of rotation;
an actuator body formed of overmolded plastic disposed about the actuator arm; and
first and second locking pins extending from the actuator body orthogonal to the axis of rotation; and
a flex cable including:
a cable body;
a first opening formed through the cable body, the first opening engaged with the first locking pin in a direction generally parallel to the longitudinal axis for retaining the flex cable; and
a second opening formed through the cable body, the second opening engaged with the second locking pin in a direction generally parallel to the axis of rotation for retaining the flex cable; and
a stiffener including a first stiffener opening with the first locking pin disposed through the first stiffener opening and a second stiffener opening with the second locking pin disposed through the second stiffener opening, the first stiffener opening including a first open end disposed at a periphery of the stiffener, and open in a direction generally parallel to the axis of rotation, the second stiffener opening including a second open end disposed at the periphery of the stiffener, and open in a direction generally parallel to the longitudinal axis.

16. The disk drive of claim 15 wherein the first and second locking pins are integrally formed with the actuator body.

17. The disk drive of claim 15 wherein the cable body includes a base film, the stiffener is formed of a material stiffer than a material of the base film.

18. The disk drive of claim 17 wherein the stiffener is formed of a metal material.

19. A head stack assembly for a disk drive, the head stack assembly comprising:
an actuator defining an axis of rotation, the actuator including:
an actuator arm defining a longitudinal axis orthogonal to the axis of rotation;
an actuator body formed of overmolded plastic disposed about the actuator arm; and
first and second locking pins extending from the actuator body orthogonal to the axis of rotation, the first and second locking pins being formed of overmolded plastic; and
a flex cable including:
a cable body;
a first opening formed through the cable body, the first opening engaged with the first locking pin in a direction generally parallel to the longitudinal axis for retaining the flex cable; and
a second opening formed through the cable body, the second opening engaged with the second locking pin in a direction generally parallel to the axis of rotation for retaining the flex cable.

20. A head stack assembly for a disk drive, the head stack assembly comprising:
an actuator defining an axis of rotation, the actuator including:
an actuator arm defining a longitudinal axis orthogonal to the axis of rotation;
an actuator body formed of overmolded plastic disposed about the actuator arm, the actuator body including a lateral surface disposed parallel to the axis of rotation and a horizontal surface disposed orthogonal to the axis of rotation; and
first and second locking pins extending from the actuator body orthogonal to the axis of rotation, a given one of first and second locking pins being attached to the horizontal surface; and
a flex cable including:
a cable body;
a first opening formed through the cable body, the first opening engaged with the first locking pin in a direction generally parallel to the longitudinal axis for retaining the flex cable; and
a second opening formed through the cable body, the second opening engaged with the second locking pin in a direction generally parallel to the axis of rotation for retaining the flex cable.

21. The head stack assembly of claim 20 wherein the given one of the first and second locking pins includes a pin base, the pin base is attached to the horizontal surface, the given one of the first and second locking pins further includes a pin shaft extending from the pin base disposed orthogonal to the axis of rotation.

22. The head stack assembly of claim 21 wherein the pin base is off-set from the lateral surface.

* * * * *